(12) United States Patent
Kaufman et al.

(10) Patent No.: US 6,450,819 B1
(45) Date of Patent: Sep. 17, 2002

(54) ROLLER STORY

(75) Inventors: Shari Kaufman, Westport; Ed Gemma, Milford, both of CT (US)

(73) Assignee: Innovative USA, Inc., Norwalk, CT (US)

( * ) Notice: Subject to any disclaimer, the term of this patent is extended or adjusted under 35 U.S.C. 154(b) by 0 days.

(21) Appl. No.: 09/780,723

(22) Filed: Feb. 9, 2001

(51) Int. Cl.⁷ .................................................. G09B 17/00
(52) U.S. Cl. ........................... 434/178; 40/518; 40/530; 281/7; 462/2; 462/14; 462/20
(58) Field of Search ................... 40/518–523; 281/6–8, 281/2–117; 434/178, 77, 197, 317; 446/147–152; 462/2, 14, 20, 15–16

(56) References Cited

U.S. PATENT DOCUMENTS

| | | | | |
|---|---|---|---|---|
| 560,204 A | * | 5/1896 | Gamble | |
| 875,828 A | * | 1/1908 | Lafoon | |
| 2,053,824 A | * | 9/1936 | Guerra | |
| 2,063,126 A | * | 12/1936 | Schelly | |
| 2,145,780 A | * | 1/1939 | Raphael | |
| 2,506,113 A | * | 5/1950 | Sorrells | |
| 4,597,743 A | | 7/1986 | Becker et al. | |
| 4,757,580 A | * | 7/1988 | Wolf | |
| 4,850,924 A | | 7/1989 | Becker et al. | |
| 5,213,504 A | * | 5/1993 | Lee | |
| 5,493,802 A | * | 2/1996 | Simson | |
| 5,951,298 A | | 9/1999 | Weitzberger | |
| 5,954,518 A | | 9/1999 | Teichberg | |
| 6,095,818 A | | 8/2000 | Brazley | |

* cited by examiner

Primary Examiner—Derris H. Banks
Assistant Examiner—Dmitry Suhol
(74) Attorney, Agent, or Firm—Hedman & Costigan, P.C.

(57) ABSTRACT

A book that is combined with a scroll upon which can be viewed augmentative material related to the story material of the book is disclosed.

12 Claims, 4 Drawing Sheets

ROLLER STORY

FIELD OF THE INVENTION

The present invention relates to a book product that is useful as an interactive children's book. More particularly, the book product comprises a book and a scroll that can be manipulated by the reader to view material on the scroll that is related to the particular portions in the book. The scroll may provide additional reading material or other material related to the subject matter in the book. The scroll may additionally contain material on the reverse side that also can be selected and viewed by the reader, which is related to the book.

BACKGROUND OF THE INVENTION

A variety of books are currently on the market which attract and maintain the interest of young children by providing means by which the reader may participate in manipulative activities associated with the story of the book.

One such book is described in U.S. Pat. No. 5,951,298, which describes a book wherein each page may have a dial, scroll, or sliding tab which is opened or moved to view the related material within the tab or scroll. The activity of the reader is thereby limited to revealing material that has been specifically placed for the reader under the tab on the page, and does not allow the reader to actively search a plurality of material to find related matter. U.S. Pat. No. 6,095,818 discloses a children's book which includes a number of coaxial rotating wheels which can be used to spell out words related to the material in the book. However, the book does not provide means by which the child may search through varied reading material to find interesting new content related to the story in the book.

Accordingly, it would be desirable to provide an interactive book which enhances the enjoyment and interest of the child by encouraging the child to search for material related to the story on an accompanying scroll.

It would also be desirable to provide a book that can aid in the development of cognitive and motor skills as the child manipulates the scroll to find and identify related material from a variety of material on a scroll.

It would also be desirable to provide a book that allows a teacher to view and read the scroll material visible through the back transparent window while holding the book so that the child can see the front of the book and scroll.

It would also be desirable to provide a book that allows the reader or teacher to replace the scroll with an alternate scroll where desired.

SUMMARY OF THE PRESENT INVENTION

These objects and others are achieved by the book product of the present invention which comprises an attachment member, a book attached to a first portion of the attachment member, and a scroll member comprising a spool attached to a second portion of the attachment member, a scroll rotatably attached to the spool and a spool turning means operatively connected to the spool.

It is therefore an object of the invention to provide a book that actively engages a child's interest by providing a book with an attached scroll wherein the child can search for and locate additional material on the scroll that is related to the reading matter of the book.

It is further an object of the invention to provide a book which engages a child's analytical skills by encouraging him to learn to discriminate between related information and unrelated material in any particular section of the story book and scroll.

It is also an object of the invention to provide a book that allows a teacher or adult to view and read the scroll material visible through the back transparent window while holding the book so that the child can see the front of the book and scroll.

It is also an object of the invention to provide a book with a removable scroll wherein the scroll can be replaced to provide alternative endings to the story, or other new, additional challenges to the reader.

DETAILED DESCRIPTION OF THE INVENTION

The following description of the preferred embodiments is presented to illustrate the present invention and is not to be construed to limit the scope of the appended claims in any manner whatsoever.

Figure 1:
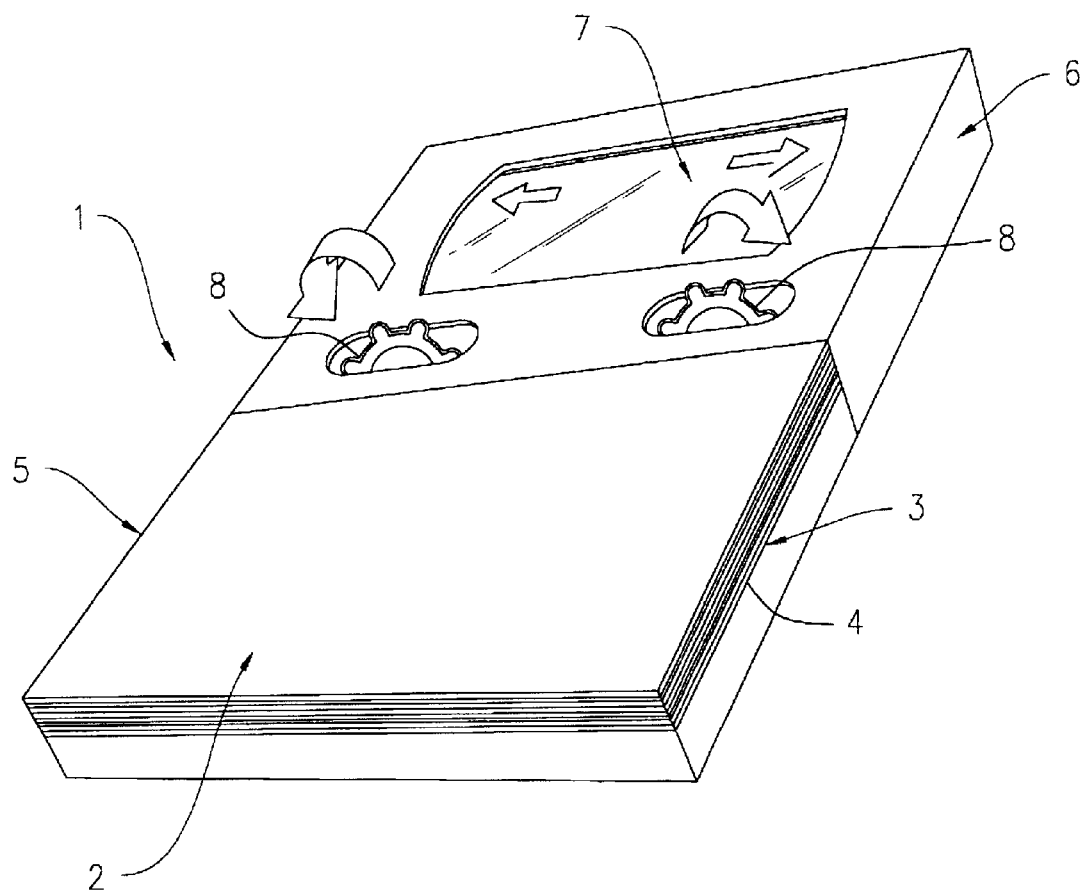
FIG. 1 is a top view of a book product of the present invention.

Referring to FIG. 1, an embodiment of the roller book (1) is comprised of a front cover (2), pages (4) and a binding means (5). A back cover for the book may also be provided or the top surface of the attachment member (6) may be employed as the back cover. In embodiments where the book is removable from the attachment member it is desirable to include a back cover. Where a back cover is provided, the book cover is also attached to the binding means. The covers and pages of the book can be made of paper, a cardboard material, or any material known to be used in books. The preferred embodiment envisions a board book. The book is attached to the front surface of an attachment member (6). In embodiments where the book is removable, an attachment means such as VELCRO™ or certain double-sided tapes may be employed to removably attach the book to the top surface of the attachment member (6). Alternatively, this may be effected by other means known to those skilled in the art. In other embodiments the book may be permanently attached to the attachment member, for example by gluing or by the binding.

The attachment member (6) may be of any color, material, or pattern that will render the book attractive to children or other readers. On a second portion of the attachment member (6) there is attached a scroll member. In the embodiment of FIG. 1, the scroll member is provided with a top side transparent view window (7) which enables the book reader to view the material on the scroll. The right and left spool turning means (8) are used to turn the scroll in either forward or backward directions. The spool turning means (8) are envisioned to be of sufficient size that they may be easily operated by a young child. A preferred embodiment of the spool turning means (8) is a single dial or paired set of dials, however paddle knobs or other turning means are within the contemplated scope of the invention. In the case of paddle knobs, engaging gears would be employed on a spring which would function to disengage the paddle not being activated. In this manner turning the paddle in one direction operates to advance the spool while turning the paddle in the reverse direction does not engage the spool.

Optionally, a handle (not shown) for carrying the book may be attached to the attachment member.

Figure 2:
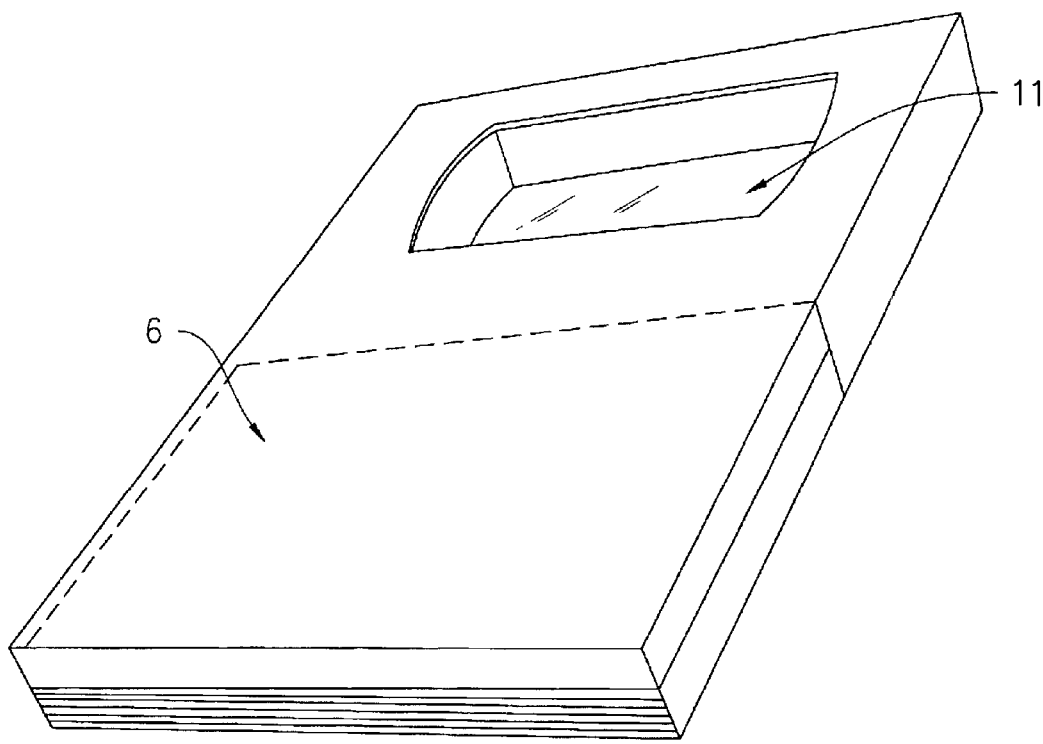
FIG. 2 is a bottom view of a book product of the present invention.

FIG. 2 is a bottom view of the attachment member (6), showing an optional transparent window on the bottom side (11) for viewing the material on the back of the scroll.

Figure 3:
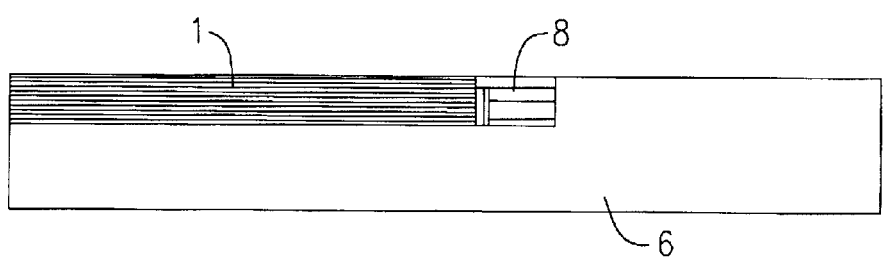
FIG. 3 is a side view of a book product of the present invention.

FIG. 3 shows a side view of the roller book (1) attached to the attachment member (6) and having a dial (8).

Figure 4:
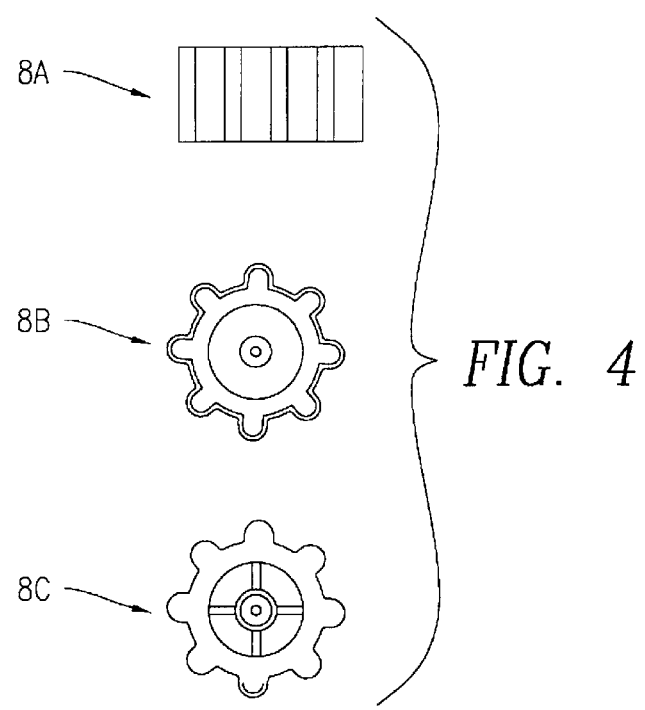
FIG. 4 shows three alternative types of dials for use in conjunction with a spool turning means.

FIG. 4 shows three alternate forms of the spool turning means (8A, 8B, 8C).

Figure 5:
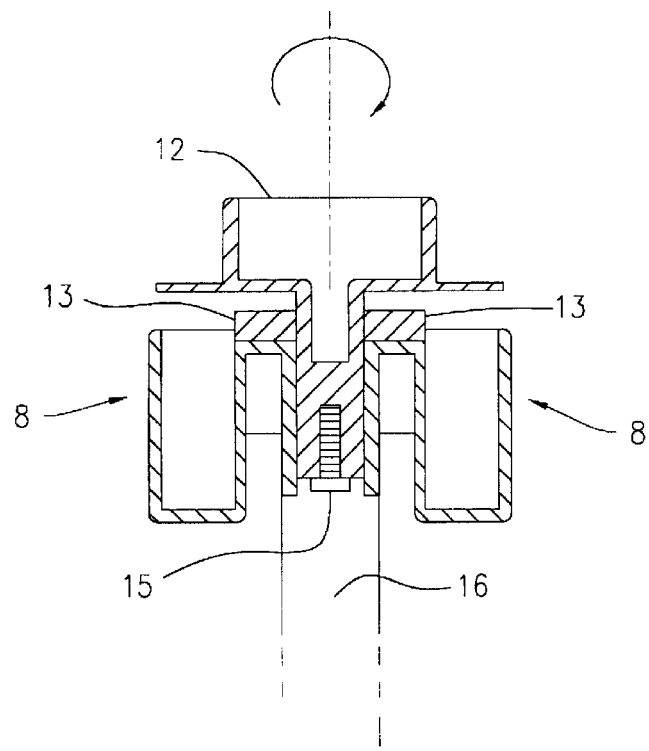
FIG. 5 shown an embodiment of the spool turning means and attachment of the turning means to the spool.

FIG. 5 shows a preferred embodiment of a spool turning means (8) useful in the practice of the present invention and its means of attachment to the spool (16). The spool turning means (8) is shown in this view in cross-section in order to reveal the attachment means. The spool turning means (8) may be attached to the spool (16) by a screw (15) through a center portion of the spool (16) or by any attachment means known to those skilled in the art. The spool has an end cap (12). A felt disc or washer (13) is employed between the end cap (12) and the spool turning means (8) to prevent introduction of excess slack in the scroll which might otherwise occur through free-wheeling of the spool.

Figure 6:
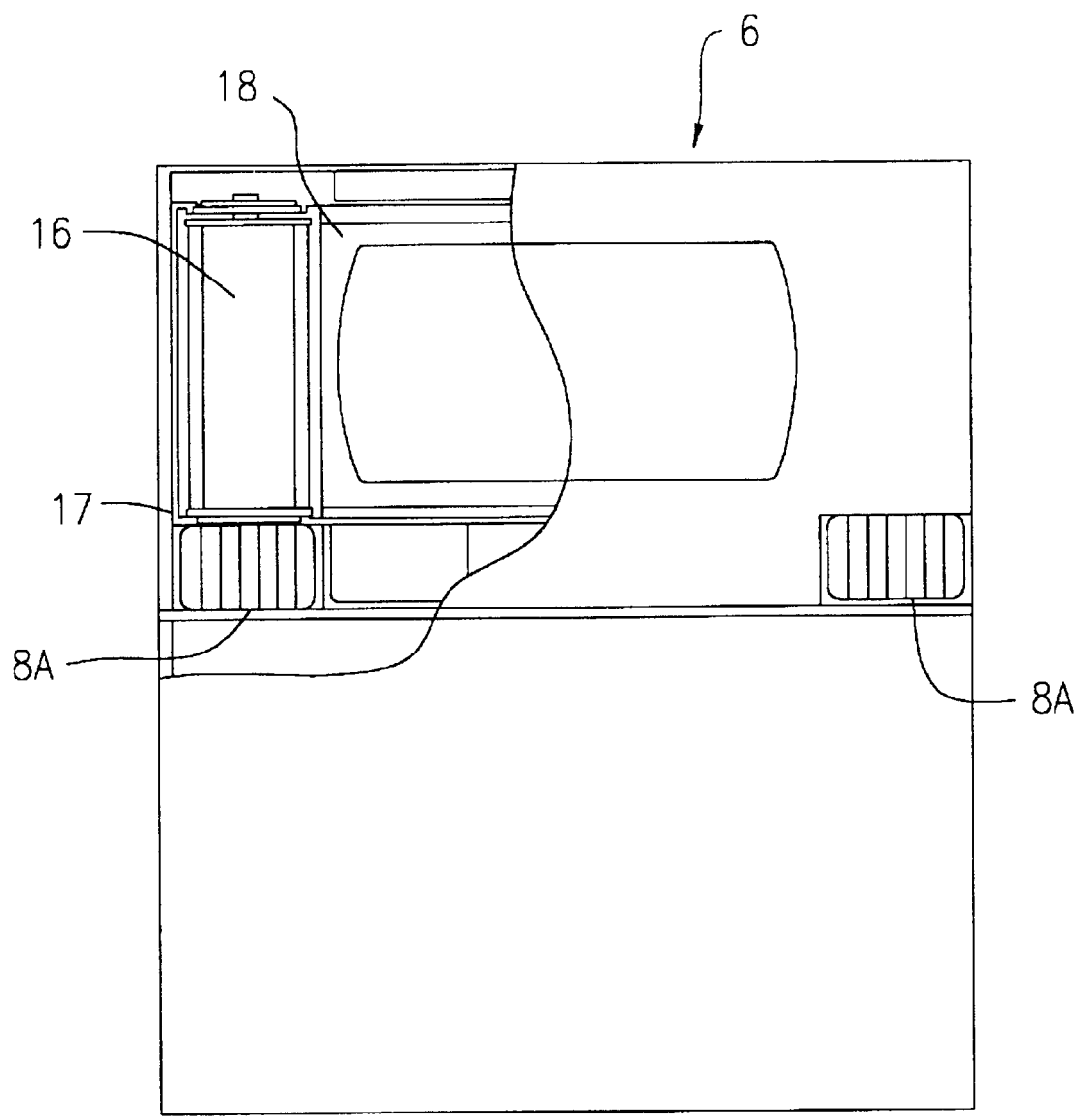
FIG. 6 shows a cut-away view of a book product of the present invention revealing the placement of the left spool.

FIG. 6 shows a cut-away view of the attachment member (6), showing the emplacement therein of the spool (16) and scroll (17). In this figure, dials (8A) are employed as the spool turning means.

Each end of the scroll may if desired be permanently attached to one of the two spools, such as by gluing, to ensure that the scroll does not disengage when the scroll has been rolled to either of its ends. Alternatively the scroll may instead be removably attached to the spool by means of a longitudinal slot in the spool, or by other attachment means that may be envisioned by one skilled in the art. In this manner more than one scroll may be provided with the book product of the present invention to allow alternate story endings or other new, additional materials for the reader.

The spool turning means (8) are shown in a preferred embodiment in FIGS. 1, 5, and 6 as being placed on the top surface of the attachment member, however it is also possible to place them in different positions, for example on the right and left sides of the attachment member by means known to those skilled in the art.

The scroll may be constructed of any printable material that is flexible enough to be employed as a scroll. The scroll is preferably printed on both sides and the preferred embodiment envisions that the material that the scroll is constructed from is such that it will prevent read-through of the printed matter. The attachment member and scrolls may be constructed such that the scroll may be removed and replaced with a different scroll that contains alternate material such as different endings for the story of the book, or varied and more challenging material for the reader. There might additionally be provided with the book a blank scroll wherein the child might provide his own content, such as animals, drawings of people and the like, or similarly, blank areas within a printed scroll where the child could add his own drawings, for example of his own family or neighborhood.

It is intended that the child could look at the cover or a page of the book and after viewing the material would then use the spool turning means to turn the scrolls while seeking to find related material. After finding this material, the child could then turn the book and attachment member over to view additional related material on the scroll through the back transparent window. Alternately, an adult may hold the book up so that the child could see and read the book and turn the scroll, while the adult could read the same material on the back of the scroll through the back transparent window.

The handle can be placed on any side of the attachment member that would be convenient for a child to carry the book.

While the invention has been described in connection with what is presently considered to be the most practical and preferred embodiments, it is to be understood that the invention is not to be limited to the disclosed embodiments, but is intended to cover various modifications and equivalent arrangements included within the spirit and scope of the appended claims.

What is claimed is:

1. A book product comprising:

(a) an attachment member;

(b) a book attached to a first portion of said attachment member, said book comprising a front cover, a back cover and at least one page therebetween; and (c) a scroll member comprising a spool attached to a second portion of said attachment member, a scroll rotatably attached to said spool and a means for turning said spool; wherein said scroll has a front side and a back side, said front and back sides of said scroll being divided into panels, and wherein said panels contain printed matter, the printed matter on the front side of said scroll being the same as the printed matter on the back side of said scroll, and wherein said scroll is encased within a front transparent window attached to a top surface of said attachment member for viewing the printed matter on the front side of said scroll and a back transparent window attached to a bottom surface of said attachment member for viewing the printed matter on the back side of said scroll.

2. A book product as defined in claim 1 wherein said book is detachably attached to said attachment member.

3. A book product as defined in claim 1 wherein said first portion of said attachment member functions as a back cover for said book.

4. A book product as defined in claim 1 wherein said book is constructed of cardboard.

5. A book product as defined in claim 1 wherein said scroll member comprises two spools and each end of the scroll is attached to a spool.

6. A book product as defined in claim 1 wherein said scroll is comprised of a paper material.

7. A book product as defined in claim 1 wherein said scroll is comprised of a pliable plastic material.

8. A book product as defined in claim 1 wherein said spool turning means comprises a right side dial for scrolling the scroll the to right and a left side dial for scrolling the scroll to the left.

9. A book product as defined in claim 1 wherein said means for turning said spool comprises a right side paddle for scrolling the scroll to the right and a left side paddle for scrolling the scroll to the left.

10. A book product as defined in claim 1 wherein said spool turning means is located on side surfaces of said attachment member.

11. A book product as defined in claim 1 wherein said spool turning means is located on a top surface of said attachment member.

12. A book product as defined in claim 1 wherein the scroll is removable.

* * * * *